INVENTOR.
SIGMUND EGE

HIS AGENT

United States Patent Office 3,047,652
Patented July 31, 1962

3,047,652
PIPE-TYPE CABLE CORE WITH ARMOR TAPE REINFORCING
Sigmund Ege, Hastings-on-Hudson, N.Y., assignor to Anaconda Wire and Cable Company
Filed Oct. 6, 1960, Ser. No. 60,948
7 Claims. (Cl. 174—108)

This invention relates to pipe-type cables and particularly to pipe-type cables having vertical runs.

For the transfer of large blocks of electrical energy at high voltage it has been known to install insulated electrical conductors within steel pipes, having their remaining space filled with insulating oil or gas, usually maintained under high pressure such as 200 p.s.i.g. The combination of pipe and insulated conductor has been known as a pipe-type cable and has been widely used in cities and other areas where exposed high-voltage transmission lines are unacceptable.

The insulating medium over the conductors of pipe-type cable is customarily made up of a plurality of layers of spirally applied paper tapes, dried under vacuum and saturated with insulating oil. When a pipe-type cable system is installed the piping which is most commonly comprised of lengths of 8 inch steel pipe, is completely laid, cleaned and pressure tested and all leaks are repaired. The insulated conductor is then pulled into the pipe, terminations and any necessary splices are made, and insulating fluid is introduced into the pipe-line.

In order to protect the fragile covering of the insulated conductors during the pulling operation it has been known to apply over the insulation an open spiral of half-round bronze wire commonly referred to as skid wire. Half-round skid wires have their flat section innermost so that the rounded portion provides a sliding surface between the insulated conductor or cable core and the inner walls of the pipe. It is seldom that a pipe-type cable can be installed in a single straight or approximately straight run. The present invention is concerned with pipe-type cables having vertical rises. Conductors pulled into such pipe will have at least one and, most usually, two bends in a vertical plane. In addition there will usually be one or more horizontal bends in any long run of cable. The incidence of bends in the pipe greatly increases the tension developed in a cable core during the pulling operation and the skid wires, by reducing the friction between the cable and the walls of the pipe, substantially reduce this tension and permit pulling longer lengths of cable than would otherwise be possible without exceeding a safe tension on the conductor.

It is, of course, highly desirable to pull cable in long lengths because this reduces the number of field splices that must be made in the cable. With modern large sized shipping reels it is now possible to ship unspliced lengths of cable of the order of 3500 feet in length. A field splice in a pipe-type cable must be made after the cable has been installed in the pipe and cannot be pulled in along with the cable. A field splice thus requires a break in the pipe-line itself and usually it requires the presence of a manhole at the splicing point. It is obvious then that economic and time-saving considerations greatly favor the reduction of the number of cable splices. Another consideration favoring a reduction in the number of splices and the use of long core-lengths for pipe-type cables is that splices, being made under field rather than controlled factory conditions are always sources of potential cable failure.

When cable is installed in vertical runs it is necessary to provide means to support the weight of the cable core which may be hanging free in a vertical pipe. It has been known to provide such cores with a serving of a plurality of armor wires over the insulation, said wires having a long length of lay and a diameter such that the plurality of wires in parallel would entirely cover the surface of the core. This prior art method of covering the cores of pipe-type cables with armor wires as a means of support at vertical runs has been characterized by a number of serious shortcomings which are enumerated below and which are entirely overcome by my invention.

When armor wires are used to support a vertical rise of cable it is usually necessary to apply a large excess of armor over that actually needed for tensile support. This comes about because the vertical runs involved are not usually high enough to require a large cross-section of armor wire for support. It is necessary, however, since the wires are applied with a very long lay, and if they are applied with open spaces between the parallel strands of wire will not remain evenly spaced around the core when the latter is wound on reels and pulled through pipe-lines, to have enough wires so that the sum of their diameters will approximately equal the circumference of the cable. The exact formula is $$nd = \frac{2\pi(D+d)}{\cos\theta}$$

where:

$d$ = diameter of the armor wires
$D$ = diameter of the core under the armor wires, in the same units as $d$
$n$ = number of armor wires
$\theta$ = angle the armor wires make with the axis of the core The cross-sectional area of armor useful in supporting the cable equals $$\frac{nd^2}{4}\cos\theta$$

and it is obvious that a diameter of armor wire can be selected at will to secure any desired total cross-sectional area. This solution would not, however, be a practicable one from the manufacturing point of view because in the usual case of a relatively short vertical rise, if the armor wire size were selected on the basis of the required cross-sectional area the wires would be so small that it would require an unmanageable number of them to cover the circumference.

When cable cores have been covered with armor wires according to known methods the skid wires have been omitted and the cables have been pulled using the armor wires alone as protection against frictional contact with the pipe surface. This fact has been another limitation on the size of armor wires since wires having a diameter sufficient to supply the tensile load of a vertical run would frequently be too fine to protect the core from abrasion during installation.

In addition to the above mentioned shortcoming of armored cores residing in that an excess of wire armor was required over that actually indicated by the tensile load, another shortcoming of known armoring methods has been that when cable was supplied in long reel lengths either a whole length would have to be armored even though the vertical run was relatively short, or a short length of armored cable would have to be spliced-in in the field. Neither of these objectionable alternatives are required in the cable of my invention.

Cable made to the teachings of my invention can be manufactured in the maximum lengths allowable by reason of shipping reel capacities or the location of manholes, irrespective of vertical runs in the pipe-line that may require tensile reinforcing.

Over lengths of cable which will require tensile reinforcing in their installed locations I apply flat armor tapes having the required combined tensile strength. I then apply a continuous spiral of skid wire over the full length of cable including the armored length. This cannot be done when wires are used for armoring in accordance with known methods because when heavy armor wires are used the diameter build-up is too great and when light armor wires are used the pressure of the skid wires will cause the armor wires to cut into the underlying core.

I can apply flat armor tapes of the required total cross-sectional area with standard cable making machinery that has been adapted to this purpose because the number of such tapes is not excessive. This is possible because tapes having the desired width to cover the circumference of the core may readily be selected to have the thickness for the total cross-section needed to support the cable. The build-up of diameter in the cable core is not enough to require any interruption in the process of applying the skid wires.

I have further found that a scuff-proof attachment of the armor-tapes is provided by folding them back over one turn of the skid wire and permitting a subsequent turn of the skid wire to pin down the folded ends.

A thorough understanding of the construction and advantages of my invention can be gained by a study of the attached drawing.

Figure 1:
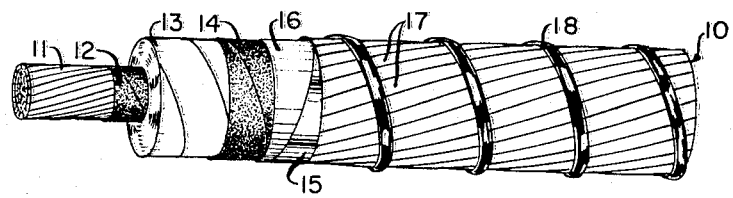
FIG. 1 is a lengthwise cut-away pictorial view of a length of cable core made in accordance with this invention.

Referring to FIG. 1 the cable core 10 has a conductor 11 wrapped with carbon black paper strand-shielding tape 12 and insulated with a heavy layer 13 of oil impregnated paper wrappings. The paper insulation 13 is wrapped with a layer 14 of semiconducting carbon black paper tape over which is applied a copper shielding tape 15 intercalated with a moisture sealing tape 16. A plurality of flat tensile tapes 17 are laid parallel in a long length of lay making a very small angle with the lengthwise dimension of the core 10. The tapes 17 may be of any material having the requisite tensile, electrical, and chemical properties of which non-magnetic stainless steel and bronze are preferred examples. To reduce the incidence of induced electrical currents the tapes 17 should have high electrical resistance and they should be made from a non-magnetic material. The tapes 17 should have adequate tensile strength and corrosion resistant, and should be compatible with insulating oils such as those used in pipe-type cables. A skid wire 18 is applied over the tapes 17 in an open helix having a direction of lay opposite to the direction of lay of the tensile tapes 17. The skid wire 18 is preferably bronze having a half-round section with the diameter facing inwardly. Among the other metals that may be used for the skid wire 18 are brass and aluminum and its alloys.

Figure 2:
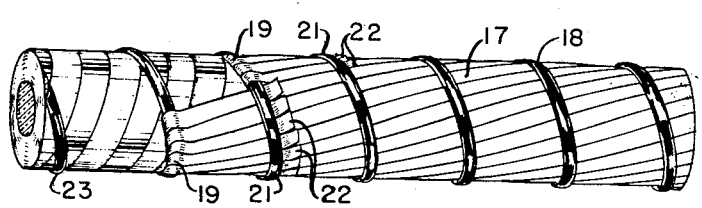
FIG. 2 is a lengthwise pictorial view of a feature of this invention.

A preferred termination of the tapes of my invention is shown in FIG. 2. Each of the tapes 17 are folded outwardly about a turn 19 of the skid wire 18. Ends 22 of the tapes 17 are cut off a short distance beyond the turn 21. The termination may be made by hand by folding back each of the tapes 17 individually or the termination may be made at the skid-wire machine during the manufacture of the core 10 by lifting the tape ends 22 before a turn 23 of the skid wire has been applied so that the turn 23 does not pin the ends 22 against the cable core. The turn 19 is then applied over the tapes 17 and the ends 22 are folded back against the cable core before the turn 21 is taken. The machine is then permitted to lay the turn 21 and the remaining turns of the skid wire 18 over the tapes 17.

Figure 3:
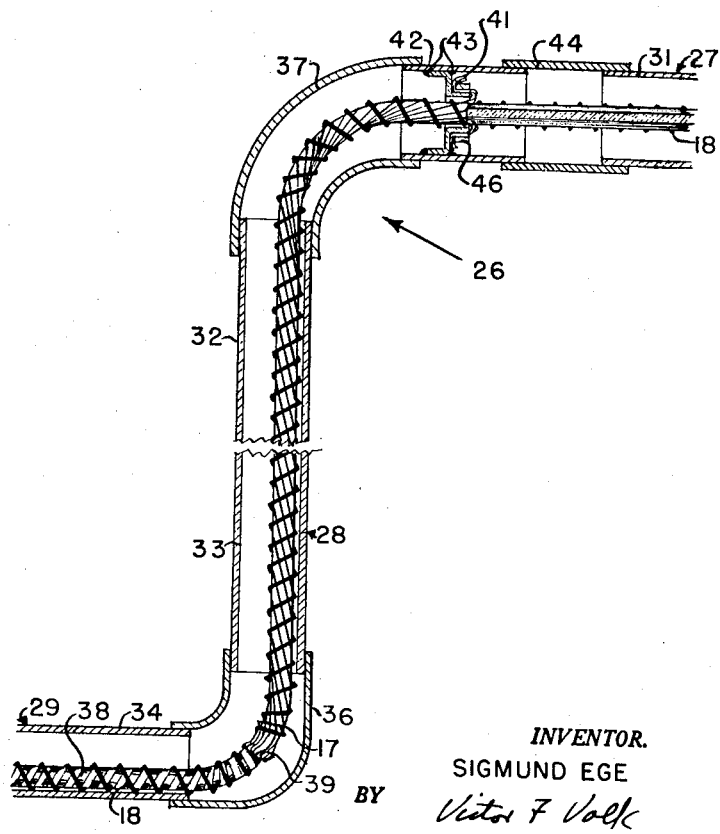
FIG. 3 is a diagrammatic sectionalized elevation of a pipe-type cable installation made in accordance with this invention.

A pipe-type cable 26 is indicated generally in FIG. 3. The cable 26 is shown having an upper horizontal length 27, a vertical rise 28 and a lower horizontal length 29. The length 27 is comprised of a steel pipe 31, the rise 28 is comprised of a plurality of steel pipe lengths of which a topmost pipe 32 and a lowermost pipe 33 are shown. The length 29 is comprised of a pipe 34. The pipe length 34 is connected by means of an elbow 36 to the pipe 33 and the pipe 31 is connected by means including an elbow 37 to the pipe 32. The cable 26 is filled with insulating oil under pressure in a known manner. A continuous cable core 38 extends through the pipe 34, the elbow 36, the vertical pipes 33 and 32, the elbow 37 and the pipe 31. It will be understood that although the lengths 29 and 27 are horizontal and the rise 28 is vertical in the embodiment of my invention shown in FIG. 3, my invention will have application to pipe-type cables in general where the change in elevation is sufficient to require tensile reinforcing for the cable core even though the rises are not vertical rises and the unreinforced lengths of core are laid in pipes that vary to a greater or lesser degree from the horizontal. The skid wire 18 is applied over the entire length of the core 38 and the tensile tapes 17 are applied over only that length of the cable 38 extending between a turn 39 of the skid wire 18 and a clamping ring 41 close to the top of the vertical run 28. The clamping ring 41 is welded to a short length 42 of the pipe 31 with ring welds 43, a jointing sleeve 44 which can slide back over the pipe 31 to permit access to the clamping ring 41 connects the short length 42 to the remainder of the horizontal pipe 31. The free ends of the tapes 17 are locked to the clamping ring 41 by means of a locking ring 43. Other means, such as by soldering, of fastening the tapes relative to the pipe length 42 will suggest themselves and I do not wish to limit my invention to the particular means shown in the drawing. Although FIG. 3 illustrates only one cable core within the pipe-type cable 26 it will be understood that a plurality of cores may be present without departing from my invention. Particularly my invention has application to 3-phase pipe-type cables wherein 3 cores 38 each having skid wires 18 and tensile tapes 17 are laid parallel within the pipe-type cable 26.

As an example of one of the advantages accruing from my invention I cite the material saving that can be realized by comparing a conventional 2000 MCM, 138 kv. cable having a 200 ft. vertical riser and employing steel wire armor, with the same cable employing armor tapes in accordance with my teaching. The conventional cable is specified to have 80 armor wires 0.109 inch in diameter and weighing a total of 2.5 lb. per foot of cable, whereas the cable of my invention requires only 33 tapes 0.020 inch thick and having a total weight of 0.6 lb. per foot of cable.

I claim:

1. A pipe-type cable core comprising a conductor, an annular layer of insulation around said conductor, a plurality of tensile tapes served in a long lay external to said insulation, a skid wire over said tensile tapes, said tensile tapes having a combined width substantially covering the circumference of said core under said skid wire.

2. An extended length of pipe-type cable core comprising a conductor, an annular layer of insulation around said conductor, a plurality of tensile tapes served in a long lay external to said insulation over a portion less than the whole of said length, a skid wire over said tapes and extending over said length of core free from said tapes.

3. An extended length of pipe-type cable core comprising a conductor, an annular layer of insulation around said conductor, said length being comprised of a first portion, a middle portion, and an end portion, a plurality of tensile tapes served in a long lay external to said insulation only over said middle portion, a skid wire over said tapes and extending over said first portion and said end portion of said length of core.

4. A pipe-type cable core comprising a conductor, an annular layer of insulation around said conductor, a plurality of stainless steel tensile tapes served in a long lay external to said insulation, a skid wire over said tensile tapes, said tensile tapes having a combined width substantially covering the circumference of said core under said skid wire.

5. A continuous splice-free length of pipe-type cable core comprising a conductor, an annular layer of insulation around said conductor, tensile reinforcing members served in a long lay external to said insulation, said reinforcing members defining a reinforced length of said core, said reinforced length being substantially shorter than said splice-free length.

6. An extended length of pipe-type cable core comprising a conductor, an annular layer of insulation around said conductor, a plurality of tensile tapes served in a long lay external to said insulation, a termination of said tapes at a section along said length, a plurality of spiral turns of skid wire over said tapes, said tapes being folded back over one of said turns and under another of said turns at said termination whereby said tapes are secured to said core at said termination.

7. A pipe-type cable comprising a pipe-line having a rise in elevation, fluid insulation within said pipe-line, a length of cable core free from field splices within said pipe-line, said cable core comprising a conductor and an annular layer of insulation around said conductor, said length of cable free from field splices having tensile reinforcing over the portion of said length within said vertical rise and being free from tensile reinforcing over a portion of said length.

References Cited in the file of this patent

UNITED STATES PATENTS

| | | |
|---|---|---|
| 468,269 | Stempel | Feb. 2, 1892 |
| 902,027 | Voris | Oct. 27, 1908 |
| 2,133,448 | Harley | Oct. 18, 1938 |
| 2,275,019 | Peterson | Mar. 3, 1942 |
| 2,665,328 | Atkinson et al. | Jan. 5, 1954 |

UNITED STATES PATENT OFFICE
CERTIFICATE OF CORRECTION

Patent No. 3,047,652                        July 31, 1962

Sigmund Ege

It is hereby certified that error appears in the above numbered patent requiring correction and that the said Letters Patent should read as corrected below.

In the drawings, in Fig. 3, the lead line from reference numeral 41 should extend to a point on the annular portion of the clamping ring immediately below the right-hand weld 43; column 2, lines 34 to 36, the formula should appear as shown below instead of as in the patent:

$$\frac{n\pi d^2}{4} \cos \theta$$

column 3, line 50, for "resistant" read -- resistance --;
column 4, line 30, for "43" read -- 46 --.

Signed and sealed this 22nd day of January 1963.

(SEAL)
Attest:
ERNEST W. SWIDER
Attesting Officer

DAVID L. LADD
Commissioner of Patents